(12) United States Patent
Sturmat (10) Patent No.: US 10,252,665 B2
(45) Date of Patent: Apr. 9, 2019

(54) METHOD FOR OPERATING A LIGHTING OF A MOTOR VEHICLE AND MOTOR VEHICLE FOR CARRYING OUT THE METHOD

(71) Applicant: VOLKSWAGEN AG, Wolfsburg (DE)

(72) Inventor: Sandra Sturmat, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/970,209

(22) Filed: May 3, 2018

(65) Prior Publication Data

US 2018/0319329 A1    Nov. 8, 2018

(30) Foreign Application Priority Data

May 3, 2017   (DE) .................. 10 2017 207 436

(51) Int. Cl.
| | | |
|---|---|---|
| *B60Q 1/50* | (2006.01) | |
| *B60Q 1/26* | (2006.01) | |
| *B60Q 1/28* | (2006.01) | |
| *B60Q 1/32* | (2006.01) | |
| *B60Q 9/00* | (2006.01) | |
| *B60Q 3/208* | (2017.01) | |
| *B60Q 3/78* | (2017.01) | |
| *B60Q 3/80* | (2017.01) | |
| *B60Q 3/14* | (2017.01) | |

(52) U.S. Cl.
CPC .............. *B60Q 1/50* (2013.01); *B60Q 1/268* (2013.01); *B60Q 1/2696* (2013.01); *B60Q 1/28* (2013.01); *B60Q 1/32* (2013.01); *B60Q 3/14* (2017.02); *B60Q 3/208* (2017.02); *B60Q 3/78* (2017.02); *B60Q 3/80* (2017.02); *B60Q 9/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,804,599 | B2 * | 10/2017 | Kentley-Klay | ...... G05D 1/0088 |
| 2010/0085181 | A1 * | 4/2010 | Brooking | ............. B60Q 1/2611 |
| | | | | 340/468 |

(Continued)

FOREIGN PATENT DOCUMENTS

| | | |
|---|---|---|
| DE | 43330014 C1 | 1/1995 |
| DE | 19745993 A1 | 4/1999 |

(Continued)

OTHER PUBLICATIONS

Search Report for German Patent Application No. 10 2017 207 436.1, dated Nov. 14, 2017.

*Primary Examiner* — Travis R Hunnings
(74) *Attorney, Agent, or Firm* — Barnes & Thornburg LLP (57) ABSTRACT

A method for operating illumination of a motorized transportation vehicle wherein a light appearance is produced, which extends over at least a large portion of a width of the motorized transportation vehicle. The light appearance becomes visible at least for a transportation vehicle driver when the motorized transportation vehicle is switched on and is subsequently changed to display a driving readiness of the motorized transportation vehicle. In this way, a very pronounced, brand-individualizing visualization of the driving readiness becomes possible, which is easily perceived by the transportation vehicle driver.

8 Claims, 8 Drawing Sheets

(56) References Cited

U.S. PATENT DOCUMENTS

| | | | |
|---|---|---|---|
| 2015/0198319 A1 | 7/2015 | Salter et al. | |
| 2016/0185387 A1* | 6/2016 | Kuoch | |
| 2017/0088038 A1* | 3/2017 | Geller | B60Q 1/50 |
| 2017/0088039 A1* | 3/2017 | Williams | B60Q 1/50 |
| 2018/0136654 A1* | 5/2018 | Kentley-Klay | G05D 1/0088 |

FOREIGN PATENT DOCUMENTS

| | | |
|---|---|---|
| DE | 102010018336 A1 | 1/2012 |
| DE | 102011014262 A1 | 9/2012 |
| DE | 102012009024 A1 | 6/2013 |
| DE | 102013225852 A1 | 6/2015 |
| DE | 102015109382 A1 | 12/2015 |
| DE | 202015006739 U1 | 12/2015 |
| DE | 102015217391 A1 | 3/2016 |
| DE | 102015210887 A1 | 9/2016 |

* cited by examiner

METHOD FOR OPERATING A LIGHTING OF A MOTOR VEHICLE AND MOTOR VEHICLE FOR CARRYING OUT THE METHOD

PRIORITY CLAIM

This patent application claims priority to German Patent Application No. 10 2017 207 436.1, filed 3 May 2017, the disclosure of which is incorporated herein by reference in its entirety.

SUMMARY

Illustrative embodiments relate to a method for operating illumination of a motorized transportation vehicle and a motorized transportation vehicle for performing the method.

BRIEF DESCRIPTION OF THE DRAWINGS

Disclosed embodiments are illustrated in the figures and will be explained in more detail with reference to the following description. Identical reference signs, even in different figures, refer to identical, comparable or functionally equivalent components. Corresponding or comparable properties are here attained even if they are not described or referred to again. In the figures, in each case schematically.

DETAILED DESCRIPTION

When buying modern motorized transportation vehicles, customers place great emphasis on properties such as, for example, sportiness, efficiency, safety, environmental friendliness, price and design. The design also includes the corresponding light design of a motorized transportation vehicle, which is influenced, for example, by the shape and arrangement of daytime running lights.

Moreover, it has also recently become known from the general prior art in transportation vehicle technology to use moving light as what is known as a coming-home function and/or leaving-home function for brand-specific individualization of a motorized transportation vehicle.

For example, when opening a motorized transportation vehicle using a radio key before the start of a journey (leaving home), chase lighting can be produced, which moves in the longitudinal, transverse and/or height direction of the motorized transportation vehicle. Corresponding chase lighting upon locking the motorized transportation vehicle is possible using the radio key after the journey has been completed and after the motorized transportation vehicle has been exited (coming home).

Known from DE 197 45 993 A1 is a method in which a motorized transportation vehicle is equipped on its outer skin of the transportation vehicle body with electroluminescent light-emitting bands. These extend continuously along the aerodynamic form of the transportation vehicle from a frontside headlamp to a tail light. The light-emitting bands are made up of a multiplicity of small, individually actuable single segments. With corresponding actuation, it is possible in this way to produce chase lighting, which takes place based on specific driving maneuvers. A proposal is that, during a parking maneuver of the motorized transportation vehicle or when the motorized transportation vehicle leaves a parking space, the chase lighting is operated such that its running direction corresponds to the respective driving direction of the transportation vehicle.

DE 43 33 014 C1 proposed a security alarm system for motorized transportation vehicles, which is intended to serve for protecting the motorized transportation vehicle occupants against attacks. A trigger is arranged within reach of the driver, and an optical signal is produced upon its actuation in an emergency situation. The optical signal can be, for example, as an elongate light-emitting band that encloses the entire window region.

DE 20 2015 006 739 U1 discloses an LED advertising illumination method for retrofitting for motorized transportation vehicles. The LED advertising illumination method can appear as a light band in the rear or in the side region at the window of the motorized transportation vehicle.

DE 10 2012 009 024 A1 describes a method for a display apparatus of a transportation vehicle. In concrete terms, a straight polyline in an instrument cluster, a straight polyline in a central display apparatus above the center console and a line-shaped illumination apparatus in the passenger side instrument panel are produced. To indicate the operational readiness or readiness for driving off after the transportation vehicle is started, the polylines are set into an oscillating motion one after another and the line-shaped illumination apparatus is activated.

DE 10 2010 018 336 A1 discloses an illumination system having a first illumination apparatus, a second illumination apparatus, a third illumination apparatus and a fourth illumination apparatus. The first and second illumination apparatuses extend in strip-type trim elements horizontally along a passenger-side instrument panel section and along the inside of a passenger door. The third illumination apparatus is integrated in trim elements of a steering wheel. Lastly, the fourth illumination apparatus in turn extends in a strip-type trim element along the inside of the driver door. A control unit can actuate the illumination apparatuses with signals that are based on environment-specific or transportation vehicle-specific data. This results in display functions of the illumination system which permit, among others, optical displays of a welcome light or leaving light or indications as regards a locked status of the transportation vehicle door lock.

DE 10 2011 014 262 A1 discloses a light-emitting apparatus for a motorized transportation vehicle having animated chase lighting. In concrete terms, the light-emitting apparatus has a plate that is made of transparent and nontransparent stripes. Arranged on the underside of the plate is a light-emitting device. The latter has a plurality of light-emitting elements which are actuable using a control device. The control device can actuate the light-emitting elements such that they light up for illumination purposes or as part of an assistance function, e.g., for alerting the transportation vehicle occupants. The plate can extend over a major trim section of a motorized transportation vehicle door or as a light-emitting strip along the entire roof liner. The intensity and the color of the light of each light-emitting element is individually actuable by way of the control device. The light-emitting elements may be actuated such that a Gaussian intensity distribution which moves in one direction, and consequently a kind of chase lighting, is produced. The latter can move in the driving direction or against the driving direction.

Finally, DE 10 2015 109 382 A1 proposes another illumination apparatus which consists of a planar illumination component that is integrated in the perimeter region of a glass pane. The illumination component can have, for example, one or more light-emitting diodes and be configured as a direction indicator or as an animated brake indicator which expands outwardly from the center.

Disclosed embodiments provide a method for operating an illumination method of a motorized transportation vehicle that contributes to a brand-specific individualization of a motorized transportation vehicle.

Disclosed embodiments also provide a suitable motorized transportation vehicle which is capable of performing the disclosed method.

The disclosure initially proceeds from a method for operating illumination of a motorized transportation vehicle, with the operation being such that a light appearance is produced which extends over at least a large portion of a width of the motorized transportation vehicle.

The light appearance becomes visible at least for a transportation vehicle driver upon switching on of the motorized transportation vehicle and is subsequently changed to indicate a driving readiness of the motorized transportation vehicle. The change in the light appearance may be continuous or constant from the point of view of the transportation vehicle driver, i.e., not jerky or abrupt.

A transportation vehicle driver is hereby clearly made aware of the fact that the motorized transportation vehicle is ready to be started. The sequence mentioned (first producing the light appearance upon switching on and subsequently changing the light appearance) results in very pronounced and memorable signaling of the driving readiness.

Switching on of the motorized transportation vehicle within the context of the disclosure is to be understood to mean an action of the driver that forms the basis for the motorized transportation vehicle putting itself into a state in which it is ready to drive or be started or checking whether this is possible.

In conventional motorized transportation vehicles having a combustion engine and in electric transportation vehicles, this action generally consists of switching on the ignition. Here, what is known as "terminal 15" is switched to the state "on". This can be done, for example, by inserting an ignition key into the ignition switch, as is typical, and bringing the ignition key into the ignition position. Subsequently, an internal controller of the motorized transportation vehicle sets everything in motion or checks everything so that the motorized transportation vehicle can be started and driven. For example, it is feasible for a check to be carried out initially as to whether a fuel pump is able to function and is ready, or whether, in the case of an electric transportation vehicle, a traction battery is sufficiently charged. After the system has ascertained the driving readiness, corresponding optical notifications typically appear on the instrument cluster behind the steering wheel of the motorized transportation vehicle.

The method is realized such that the change in the light appearance likewise takes effect over at least a large portion of the width of the motorized transportation vehicle. This results in a clear improvement of the ability to be perceived by the transportation vehicle driver. A high recognition value can be given to the disclosed method if the change in the light appearance starts from a longitudinal center plane of the motorized transportation vehicle and continues in two opposite directions as viewed in the width of the motorized transportation vehicle. With this type of visualization, the transportation vehicle driver associates the change in light appearance with appearances he is already familiar with, which he understands intuitively and which he will pay great attention to (horizontal bars/barriers="stop, you cannot move in the forward direction"; horizontal opening="you can go").

In accordance with a further realization of the principle of the disclosure, a multiplicity of light-emitting regions are changed sequentially in series such that, with respect to the motorized transportation vehicle, the continuously changing light appearance is produced. This can easily be technically realized.

Light-emitting regions can be formed here, for example, directly by a multiplicity of light-emitting methods, such as light-emitting diodes (LEDs). Alternatively it is feasible for the light-emitting regions to be formed only indirectly, for example, using optical units which can be arranged downstream of corresponding light-emitting methods. It is also conceivable that the light-emitting regions are formed by light output coupling structures in light-guiding elements, by luminous foils or the like, with this list not being intended to be exhaustive.

In accordance with the disclosure, the sequential change of the light-emitting regions is effected by reducing the light intensity of the light-emitting regions or by a change from one specific color to a different specific color of the light-emitting regions. Thus, it is feasible, for example, for the light appearance to continuously change from the color red (which signals "stop") to the color green (which signals "go"). It is also feasible, for example, for the light appearance to change from light having a high light intensity to light having a low light intensity.

A contribution to an extremely good perceivability of the changing light appearance can be made if the sequential change of the light-emitting regions is effected by switching off the light-emitting regions.

The light appearance is visible for a transportation vehicle driver if light-emitting regions which are present at least along the window line of a windshield are sequentially changed. The light appearance can here be produced below the windshield. It is also feasible for the light appearance to be produced above and below the windshield.

An unusual optical effect can be achieved if at least light-emitting regions within an area of the windshield are changed sequentially. In this case, the light appearance appears to the transportation vehicle driver as if a curtain opens in front of his eyes and invites him, as it were, to drive.

As mentioned in the introductory part, the disclosed embodiments are also intended to claim a motorized transportation vehicle for performing the transportation method.

A motorized transportation vehicle which is suitable therefor is equipped with a multiplicity of light-emitting regions along at least a large portion of a width of the motorized transportation vehicle. By way of the light-emitting regions, it is possible to produce a light appearance which is visible for a transportation vehicle driver and extends, with respect to the motorized transportation vehicle, at least over a large portion of the width of the motorized transportation vehicle, or is produced thereby.

The motorized transportation vehicle is equipped with at least one control device for actuating light-emitting methods for changing the light-emitting regions. Upon switching on of the motorized transportation vehicle, the light-emitting methods are actuable, or are actuated, such that initially the light appearance is produced. Subsequently, a driving readiness of the motorized transportation vehicle can be indicated, or is indicated, by way of the light-emitting methods being able to be actuated, or being actuated, by the control device such that the light appearance changes with respect to the motorized transportation vehicle. The change in the light appearance is effected in a manner which appears to be constant or continuous for a transportation vehicle driver, for example, in the manner of chase lighting.

For the purposes of attracting a high degree of attention, the change in the light appearance is likewise able to be performed over at least a large portion of the width of the motorized transportation vehicle, or is performed in that way.

For the change in the light appearance to be easily perceivable by the transportation vehicle driver, the actuation of the light-emitting method is able to be performed, or is performed, such that the light-emitting methods are sequentially switched off and the change in the light appearance proceeds from a longitudinal center plane of the motorized transportation vehicle and continues in two opposite directions as viewed in the width of the motorized transportation vehicle.

Figure 1:
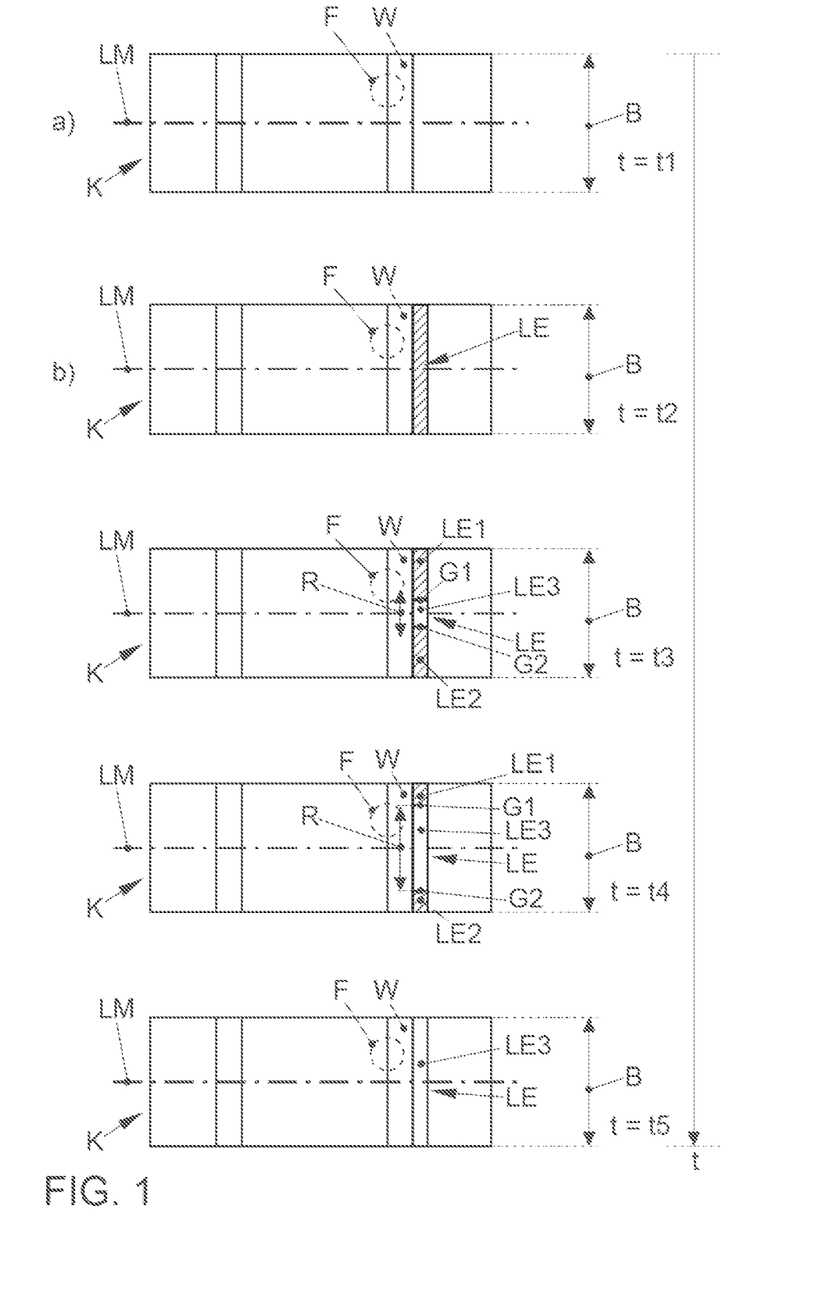
FIG. 1 shows an illustration of a motorized transportation vehicle which is operated in accordance with the disclosed method.

Reference is first made to FIG. 1. Here, a motorized transportation vehicle K is illustrated at five time points of a time period t (t1 to t5). At the time point t=t1, a transportation vehicle driver F has already entered the motorized transportation vehicle K. The motorized transportation vehicle K has a width B. LM designates a longitudinal center plane of the motorized transportation vehicle K.

At the time point t=t2, the transportation vehicle driver F switches on the motorized transportation vehicle K by activating the ignition, whereupon a light appearance LE having a high luminous intensity appears. The light appearance LE extends directly below a windshield W over the entire width B of the motorized transportation vehicle K.

As soon as the motorized transportation vehicle K is ready to be driven (timet=t3), the light appearance LE begins to change. This occurs in a manner in which, starting from the longitudinal center plane LM of the motorized transportation vehicle K, a non-light-emitting part LE3 of the light appearance LE is produced. Light-emitting parts LE1 and LE2 of the light appearance LE are still present on both sides of the non-light-emitting part LE3. The non-light-emitting part LE3, however, expands constantly or continuously over the width B, which is indicated by a direction R of change in light appearance LE. Strictly speaking, two change boundary regions G1 and G2 are produced, which each move outwardly toward the outside of the motorized transportation vehicle K. This is still true at a time point t=t4.

It should be pointed out here that each change boundary region G1, G2 is a region in which a specific light-emitting region 10 (cf. also FIG. 2) is changing from one specific state to another state.

The state can here be characterized, for example, by the magnitude of the luminous intensity and/or by the color of the emitted light. In the exemplary embodiment, the luminous intensity in the respective boundary region is reduced from a maximum luminous intensity to zero.

Finally (at a time point t=t5), the change boundary regions G1, G2 have moved so far to the outside that the light appearance LE is made up only of the non-light-emitting part LE3.

Figure 2:
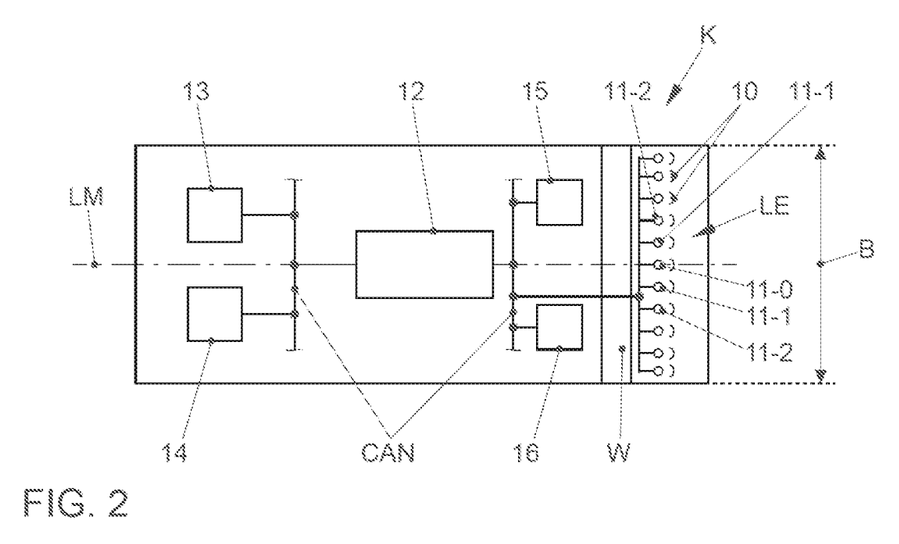
FIG. 2 shows the illustration of a motorized transportation vehicle for performing the disclosed method.

FIG. 2 shows by way of example a technical embodiment of the motorized transportation vehicle K so that it is suitable for performing the disclosed method. Here, only the elements which are essential for understanding the disclosure are illustrated.

For example, light-emitting regions 10 can be seen, which extend over the width B of the motorized transportation vehicle K along the windshield W. The light-emitting regions 10 in the present case are embodied as scattering optical units which are arranged optically downstream of light-emitting methods which may be light-emitting diodes (LEDs). The light-emitting methods are embodied as what are known as RGB LEDs, with the result that the light-emitting methods and consequently the light-emitting regions 10 can emit light in different desired colors. The only light-emitting methods designated here are a light-emitting method 11-0, which is situated in the longitudinal center plane LM, and light-emitting method 11-1 and 11-2, which are arranged on either side thereof.

A control device 12 is connected in signal-technological terms to the light-emitting methods and to transportation vehicle components 13, 14, 15 and 16 by a CAN bus CAN. The transportation vehicle components 13 to 16 must be in sound condition for a driving readiness of the motorized transportation vehicle K to be confirmed. The transportation vehicle components 13 to 16 can be made up, purely by way of example, of brakes, engine control unit, fuel pump and/or a traction battery. After the ignition is switched on, the control device 12 can evaluate signals of the transportation vehicle components 13 to 16 and deduce therefrom a driving readiness or an error. The light-emitting methods are actuable by the control device 12 based thereon.

After the motorized transportation vehicle K is switched on by a transportation vehicle driver, all light-emitting methods 11-0, 11-1, 11-2 etc. are supplied with energy of maximum intensity. Consequently, all light-emitting regions 10 light up, as a result of which a light appearance LE is produced by the light-emitting regions 10, which extends over the width B of the motorized transportation vehicle K or at least over a large portion of the width B. It is assumed in the present exemplary embodiment that the motorized transportation vehicle K is ready to be driven and no notable errors have been detected.

For this reason, the light-emitting methods are subsequently actuated sequentially one after the other by the control device 12. The actuation takes place in a way such that switched off first is the central light-emitting method 11-0, next the light-emitting method 11-1 that is nearest in the outward direction, and then the light-emitting method 11-2, which are located even further outward, and so on, until finally the last light-emitting methods that are located entirely on the outside in the figure are switched off. By switching off the light-emitting methods sequentially, the non-light-emitting and constantly enlarging part LE3 is formed (cf. FIG. 1).

Figure 3A:
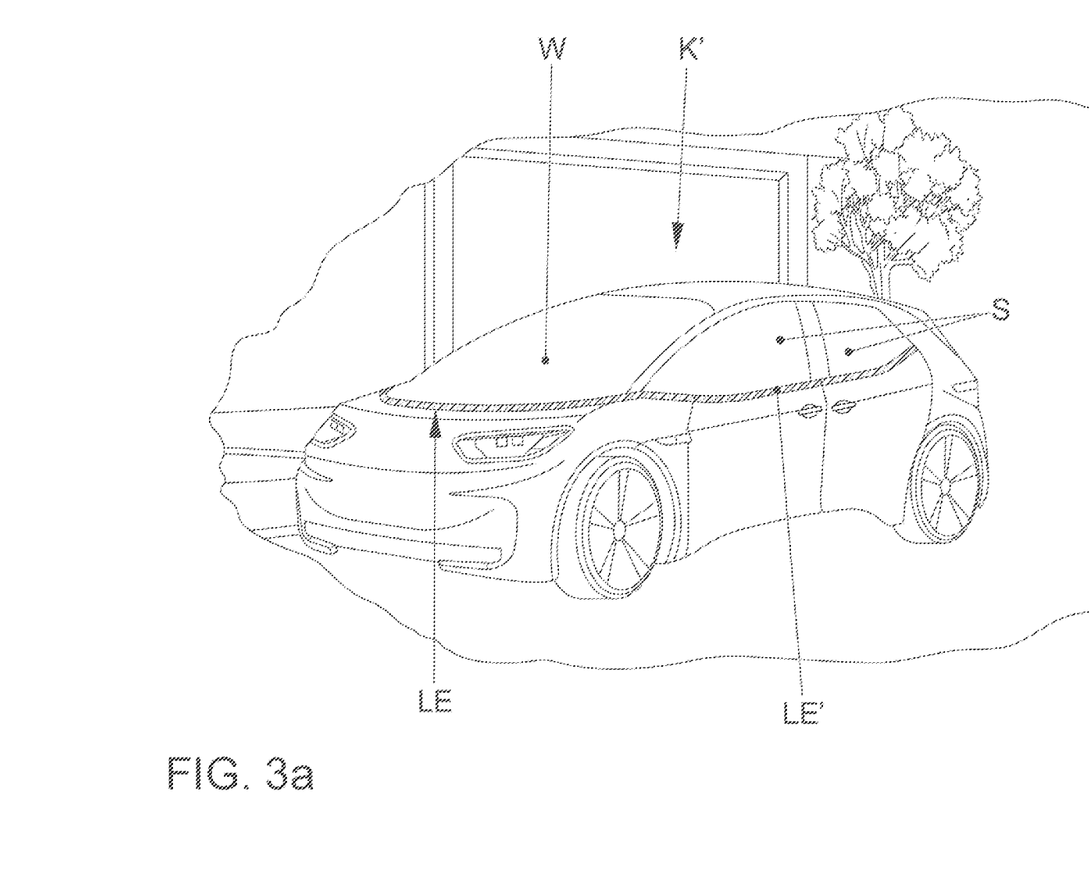
FIGS. 3a-c show the illustration of a motorized transportation vehicle having a changing light appearance below the windshield.
Figure 3B:
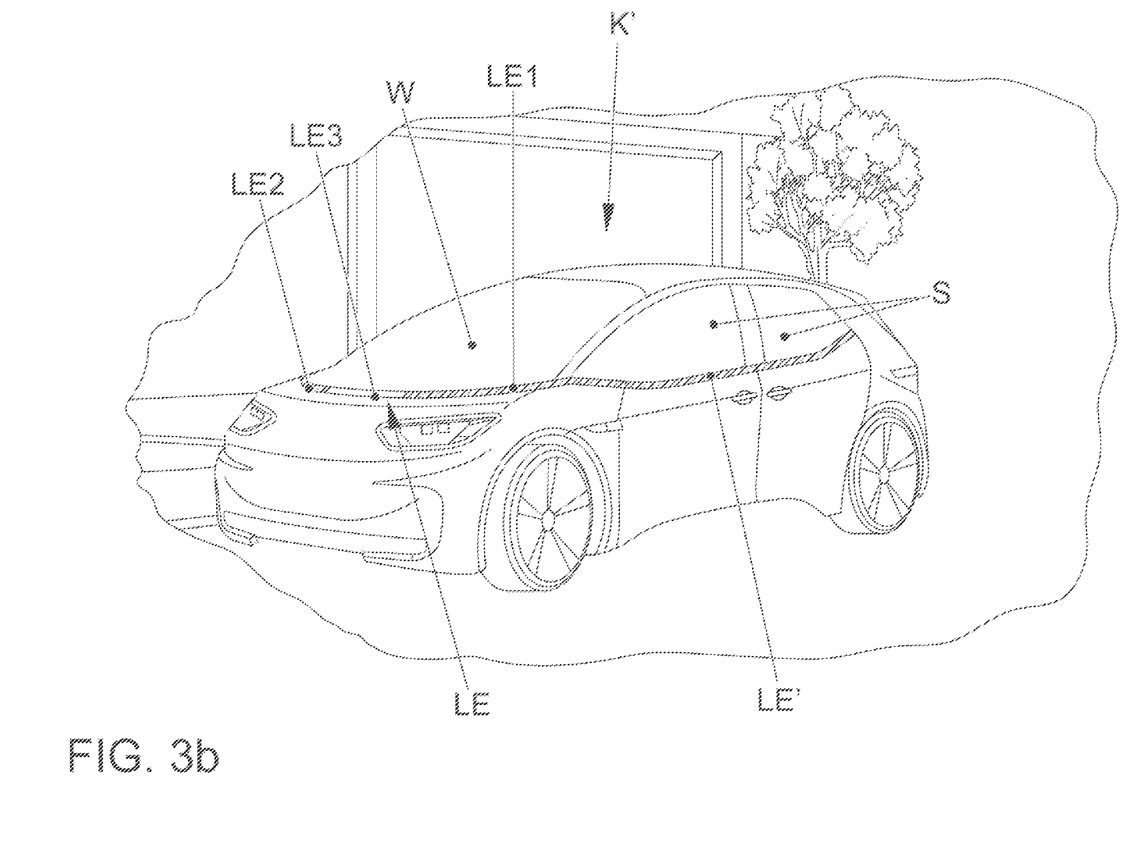
Figure 3C:
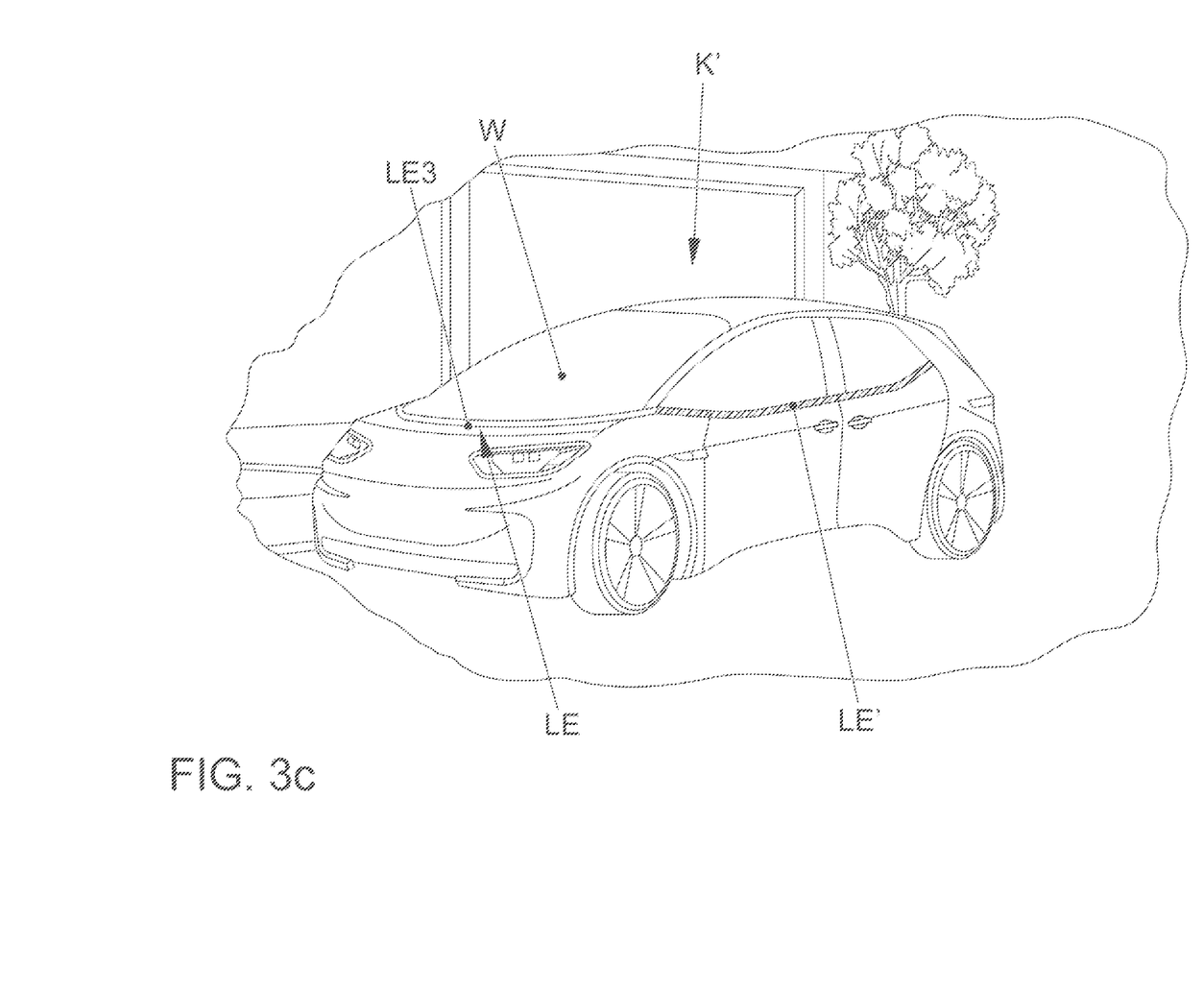

An exemplary embodiment of a disclosed motorized transportation vehicle K' will be described now with reference to FIGS. 3a-c, in which the light appearance LE extends in a line below the windshield W.

For example, the motorized transportation vehicle K' is at a standstill and a transportation vehicle driver (not visible) has switched on the ignition. As a result, first the light appearance LE is formed by a luminous line. LE' designates a light appearance which extends laterally below and along the side windows (FIG. 3a).

As soon as the motorized transportation vehicle K' is ready to be driven (FIG. 3b), a central, non-light-emitting part LE3 and light-emitting parts LE1 and LE2 on either side thereof are formed.

The non-light-emitting part LE3 continues to expand constantly, such that after a short time (FIG. 3c), the light appearance LE is formed only by the non-light-emitting part LE3.

Instead of switching the light-emitting methods for producing the light-emitting parts LE1 and LE2 and the non-light-emitting part LE3 on and off, the light-emitting methods can also be actuated such that, in a similar manner, the parts LE1 and LE2 are produced with a first color and the part LE3 is produced with a second color. It is thus feasible, for example, to make the part LE3 light up in a green color and the parts LE1, LE2 light up in a red color.

FIGS. 4a-e illustrate an exemplary embodiment of a motorized transportation vehicle K", in which a light appearance LE is produced and changed in the area of the windshield W.

In this case, once the transportation vehicle driver (not shown) has entered the transportation vehicle K" (FIG. 4a) and after the motorized transportation vehicle K" has been switched on (FIG. 4b), first the entire windshield W lights up such that a light appearance LE is produced, which consists only of one illuminated part which consequently extends nearly over the entire width B of the motorized transportation vehicle K".

If the motorized transportation vehicle K" is ready to be driven (from FIG. 4c onward), a central, non-light-emitting part LE3 is formed, which expands outwardly to both sides of the motorized transportation vehicle K", that is to say in the direction of the side-view mirrors. R in turn designates the direction of change of the light appearance LE. Light-emitting regions LE1 and LE2 are embodied on both sides of the non-light-emitting part LE3.

A short time later (FIG. 4d), the "light curtain" has already been pulled back so far that the non-light-emitting part LE3 of the light appearance LE is already significantly larger than the sum of the light-emitting parts LE1 and LE2.

Figure 4A:
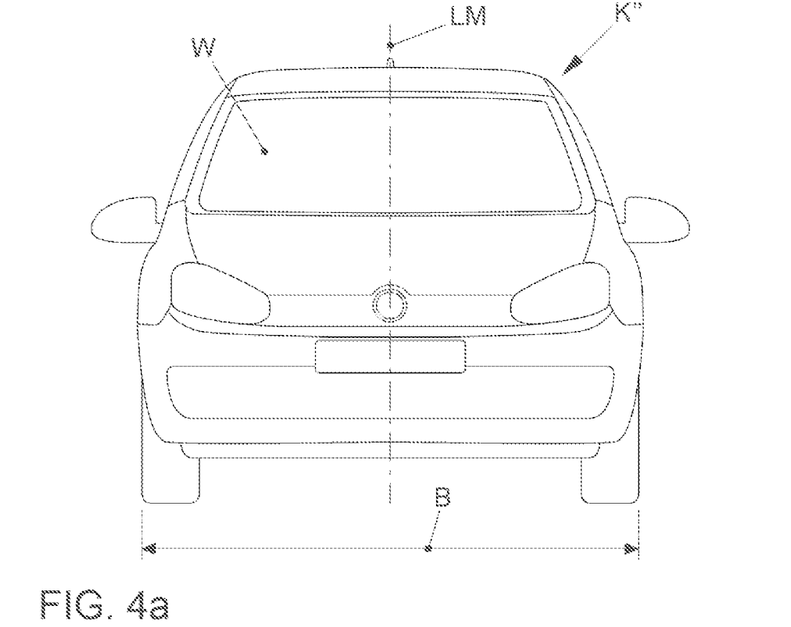
FIGS. 4a-e show the illustration of a motorized transportation vehicle having a changing light appearance in the areas of the windshield.
Figure 4B:
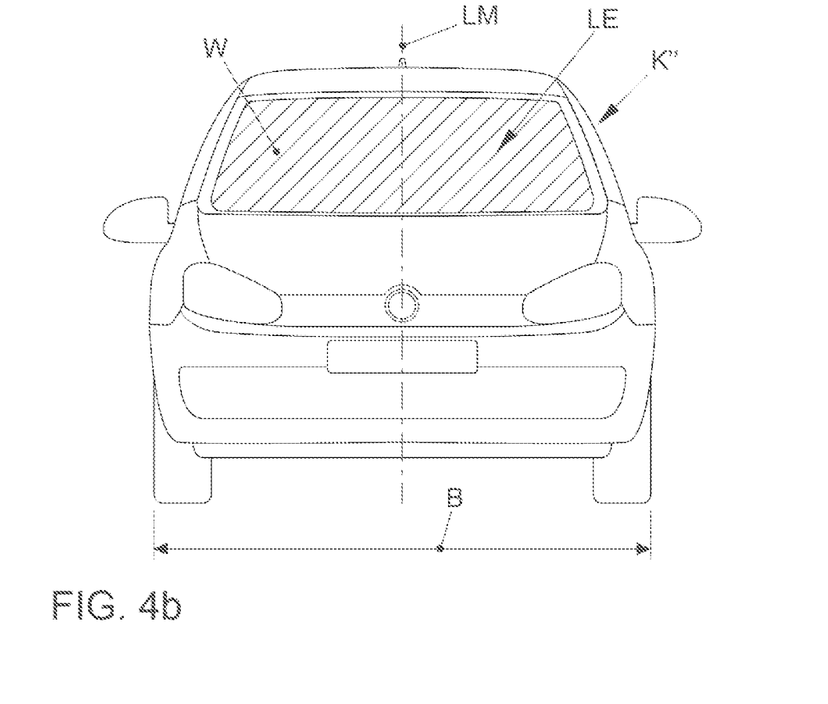
Figure 4C:
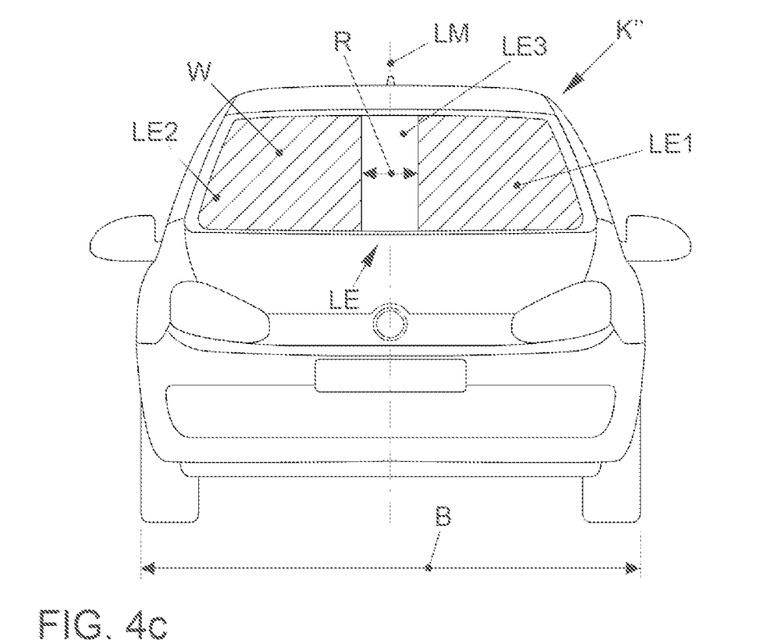
Figure 4D:
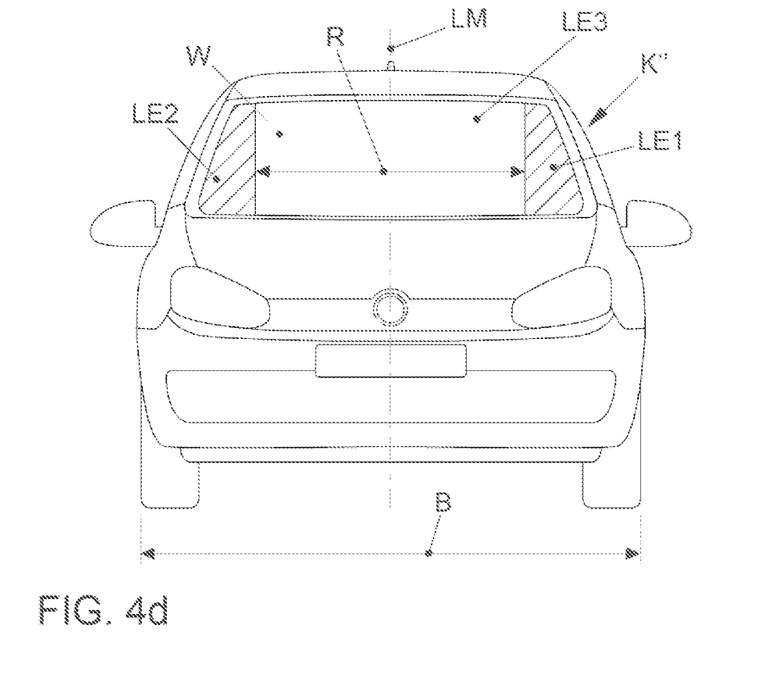
Figure 4E:
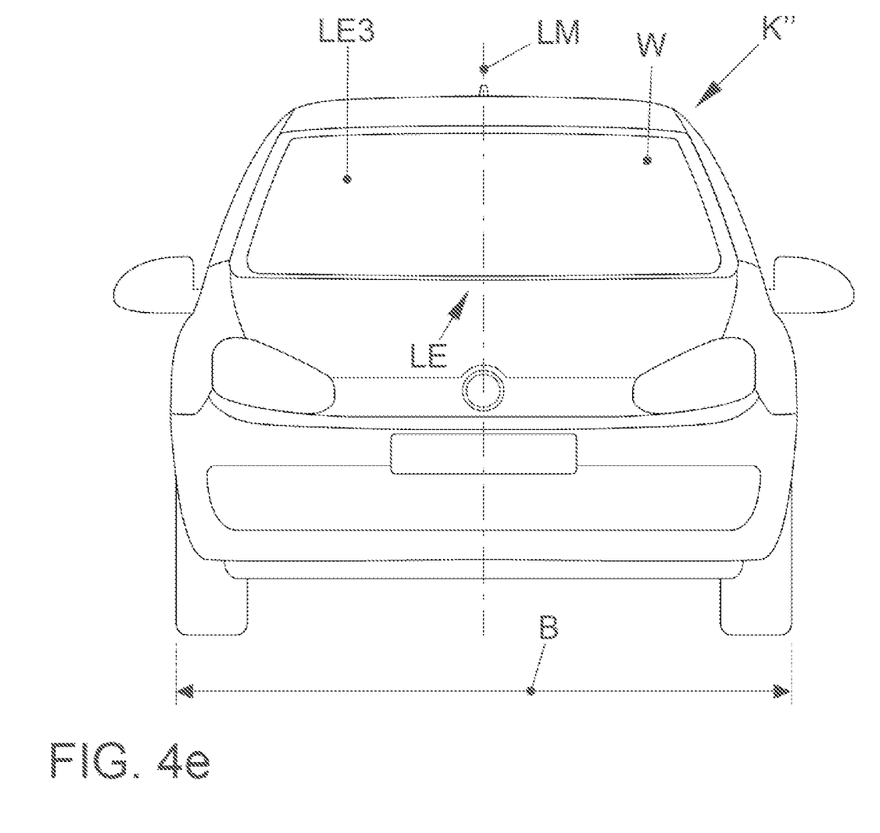

Finally, the "light curtain" is pulled back completely and the light appearance LE is formed only by the non-light-emitting part LE3 (FIG. 4e). The driving readiness and "go" are consequently signaled very clearly to the transportation vehicle driver.

List of reference signs

| | |
|---|---|
| 10 | light-emitting regions |
| 11 | light-emitting method; LEDs |
| 11-0 | light-emitting method; LEDs |
| 11-1 | light-emitting method; LEDs |
| 11-2 | light-emitting method; LEDs |
| 11-3 | light-emitting method; LEDs |
| 12 | control device |
| 13-16 | transportation vehicle components |
| B | width of the motorized transportation vehicle |
| CAN | CAN bus |
| F | transportation vehicle driver |
| G1, G2 | change boundary regions |
| K, K', K" | motorized transportation vehicle |
| LE, LE' | light appearance |
| LE1 | part of the light appearance |
| LE2 | part of the light appearance |
| LE3 | part of the light appearance |
| LM | longitudinal center plane |
| R | direction of change |
| S | side windows |
| t | time |
| t1-t5 | time points |
| W | windshield |

The invention claimed is:

1. A method for operating illumination of a transportation vehicle, the method comprising:
producing a light appearance, which extends over a width of the transportation vehicle, wherein the light appearance becomes visible at least to a transportation vehicle driver when the transportation vehicle is switched on;
subsequently effecting a change in the light appearance to display indication of a driving readiness of the transportation vehicle,
wherein the change in the light appearance is made over the width of the transportation vehicle,
wherein the change in the light appearance proceeds from a longitudinal center plane of the transportation vehicle and continues in two opposite directions,
wherein, proceeding from the longitudinal center plane, a part of the light appearance is produced with two change boundary regions that each move outwardly toward the outside of the transportation vehicle such that the light appearance expands continuously over the width of the transportation vehicle, and
wherein a multiplicity of light-emitting regions are changed sequentially one after the other so the continuously changing light appearance with respect to the transportation vehicle is produced and the sequential change of the light-emitting regions is effected by reducing the light intensity of the light-emitting regions or by a change from one specific color to another specific color of the light-emitting regions.

2. The method of claim 1, wherein the sequential change of the light-emitting regions is effected by switching off the light-emitting regions.

3. The method of claim 1, wherein light-emitting regions which are present at least along the window line of a windshield are sequentially changed.

4. The method of claim 1, wherein at least light-emitting regions within an area of the windshield are sequentially changed.

5. A transportation vehicle for performing a method for operating illumination of the transportation vehicle, the transportation vehicle comprising:
light-emitting means for a multiplicity of light-emitting regions along a width of the transportation vehicle, configured such that a light appearance, which is visible to a transportation vehicle driver, extends, with respect to the transportation vehicle, over the width of the transportation vehicle; and
at least one control device for actuating the light-emitting means for changing light emitted from the light-emitting means in the multiplicity of light emitting regions,
wherein, in response to the transportation vehicle being switched on, the light emitting means are actuable, or actuated, under control of the control device so the light appearance appears and subsequently changes to display an indication of a driving readiness of the transportation vehicle,
wherein the change in the light appearance is performed over the width of the transportation vehicle,
wherein the actuating of the light-emitting means is effected so the light-emitting regions are changed sequentially, and
wherein the change of the light appearance proceeds from a longitudinal center plane of the transportation vehicle and continues in two opposite directions.

6. The vehicle of claim 5, wherein the sequential change of the light-emitting regions is effected by switching off the light-emitting means.

7. The vehicle of claim 5, wherein light-emitting regions which are present at least along the window line of a windshield are sequentially changed.

8. The vehicle of claim 5, wherein at least light-emitting regions within an area of the windshield are sequentially changed.

* * * * *